United States Patent
Malinovskaya et al.

(10) Patent No.: US 11,619,826 B2
(45) Date of Patent: Apr. 4, 2023

(54) AUGMENTED REALITY (AR) DISPLAY APPARATUS AND METHOD

(71) Applicant: SAMSUNG ELECTRONICS CO., LTD., Suwon-si (KR)

(72) Inventors: Elena Gennadievna Malinovskaya, Moscow (RU); Igor Vitalievich Yanusik, Moscow region (RU); Alexander Viktorovich Morozov, Moscow region (RU); Anstasiia Vladimirovna Morozova, Moscow (RU); Dong Kyung Nam, Yongin-si (KR); Jin Ho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 667 days.

(21) Appl. No.: 16/376,275

(22) Filed: Apr. 5, 2019

(65) Prior Publication Data

US 2019/0317325 A1    Oct. 17, 2019

Related U.S. Application Data

(60) Provisional application No. 62/658,800, filed on Apr. 17, 2018.

(30) Foreign Application Priority Data

Jul. 5, 2018    (RU) .......................... RU2018124648
Jan. 29, 2019    (KR) ....................... 10-2019-0010957

(51) Int. Cl.
*G02B 27/28*    (2006.01)
*B60K 35/00*    (2006.01)
(Continued)

(52) U.S. Cl.
CPC ............ *G02B 27/283* (2013.01); *B60K 35/00* (2013.01); *G02B 5/3033* (2013.01);
(Continued)

(58) Field of Classification Search
CPC ...... B60K 2370/1529; B60K 2370/177; B60K 2370/23; B60K 2370/29; B60K 35/00;
(Continued)

(56) References Cited

U.S. PATENT DOCUMENTS 5,237,446 A * 8/1993 Takahashi .......... G02B 27/1006
                                                                348/337
5,486,840 A    1/1996 Borrergo et al.
(Continued)

FOREIGN PATENT DOCUMENTS

DE    11 2016 002 740 T5    2/2018
EP         0456427 B1 *    1/1998    ............. G02B 19/00
(Continued)

OTHER PUBLICATIONS

Communication dated Oct. 18, 2022 issued by the Japanese Patent Office in application No. 2019-077028.
(Continued)

*Primary Examiner* — Joseph P Martinez
*Assistant Examiner* — Vipin Patel
(74) *Attorney, Agent, or Firm* — Sughrue Mion, PLLC

(57) ABSTRACT

An augmented reality (AR) display apparatus includes an outputter that outputs first radiation including visual information in a predetermined spectrum, a polarizing plate that absorbs a first s-polarized radiation from the first radiation and transmits a first p-polarized radiation and an optical layer that reflects at least a portion of the first p-polarized radiation incident on a first side of the optical layer with a wavelength corresponding to the predetermined spectrum.

28 Claims, 9 Drawing Sheets

(51) Int. Cl.
G02B 5/30 (2006.01)
G02B 6/35 (2006.01)
G02B 27/42 (2006.01)
G02B 27/01 (2006.01)

(52) U.S. Cl.
CPC ....... *G02B 6/3512* (2013.01); *G02B 27/4261* (2013.01); *B60K 2370/1529* (2019.05); *B60K 2370/177* (2019.05); *B60K 2370/23* (2019.05); *B60K 2370/29* (2019.05); *G02B 27/0103* (2013.01)

(58) Field of Classification Search
CPC ...... G02B 2027/0118; G02B 2027/012; G02B 27/0101; G02B 27/0103; G02B 27/283; G02B 27/4261; G02B 5/3033; G02B 6/3512
See application file for complete search history.

(56) References Cited

U.S. PATENT DOCUMENTS

| | | | |
|---|---|---|---|
| 5,900,976 A * | 5/1999 | Handschy | G02B 5/3033 359/485.03 |
| 5,999,314 A | 12/1999 | Asakura et al. | |
| 6,359,737 B1 | 3/2002 | Stringfellow | |
| 6,661,475 B1 | 12/2003 | Stahl et al. | |
| 6,952,312 B2 * | 10/2005 | Weber | B32B 17/10036 359/630 |
| 7,355,796 B2 | 4/2008 | Robinson | |
| 9,007,535 B2 | 4/2015 | Fujikawa | |
| 2004/0109251 A1 | 6/2004 | Freeman | |
| 2007/0057781 A1 * | 3/2007 | Breed | H01Q 1/3233 340/457.1 |
| 2009/0153962 A1 | 6/2009 | Okada et al. | |
| 2012/0207007 A1 * | 8/2012 | Miyasaka | G11B 7/1275 |
| 2013/0250415 A1 * | 9/2013 | Gupta | G02B 5/3041 359/489.09 |
| 2014/0198368 A1 | 7/2014 | Urey et al. | |
| 2016/0025973 A1 | 1/2016 | Guttag et al. | |
| 2017/0052369 A1 | 2/2017 | Shimatani et al. | |
| 2017/0235030 A1 | 8/2017 | Tanaka et al. | |
| 2017/0357088 A1 | 12/2017 | Matsuzaki et al. | |
| 2018/0144542 A1 | 5/2018 | Park et al. | |
| 2019/0034731 A1 | 1/2019 | Lee et al. | |

FOREIGN PATENT DOCUMENTS

| | | |
|---|---|---|
| EP | 3 001 236 A2 | 3/2016 |
| JP | 2-141720 A | 5/1990 |
| JP | 7-134265 A | 5/1995 |
| JP | 11-249062 A | 9/1999 |
| JP | 2009128658 A | 6/2009 |
| JP | 2013127489 A | 6/2013 |
| JP | 2016122041 A | 7/2016 |
| WO | 2017094249 A1 | 6/2017 |
| WO | 2017188276 A1 | 11/2017 |

OTHER PUBLICATIONS

Communication dated Sep. 17, 2020, from the Russian Federal Service for Intellectual Property in Application No. 2018124648.
Communication dated Mar. 1, 2022, issued by the National Intellectual Property Administration, PRC, in Chinese Application No. 201910288122.8.

* cited by examiner

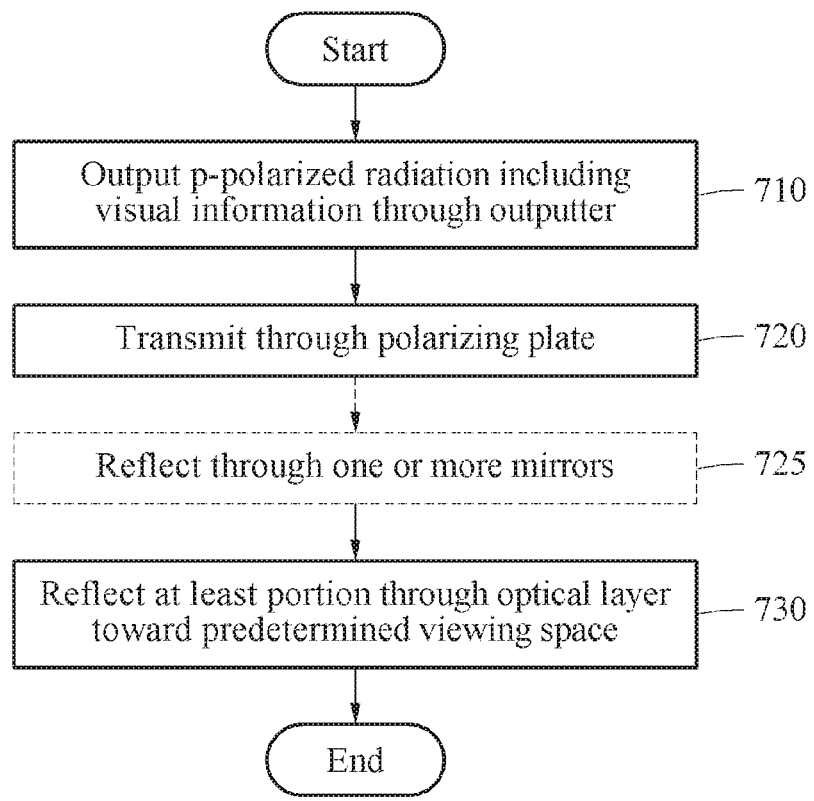

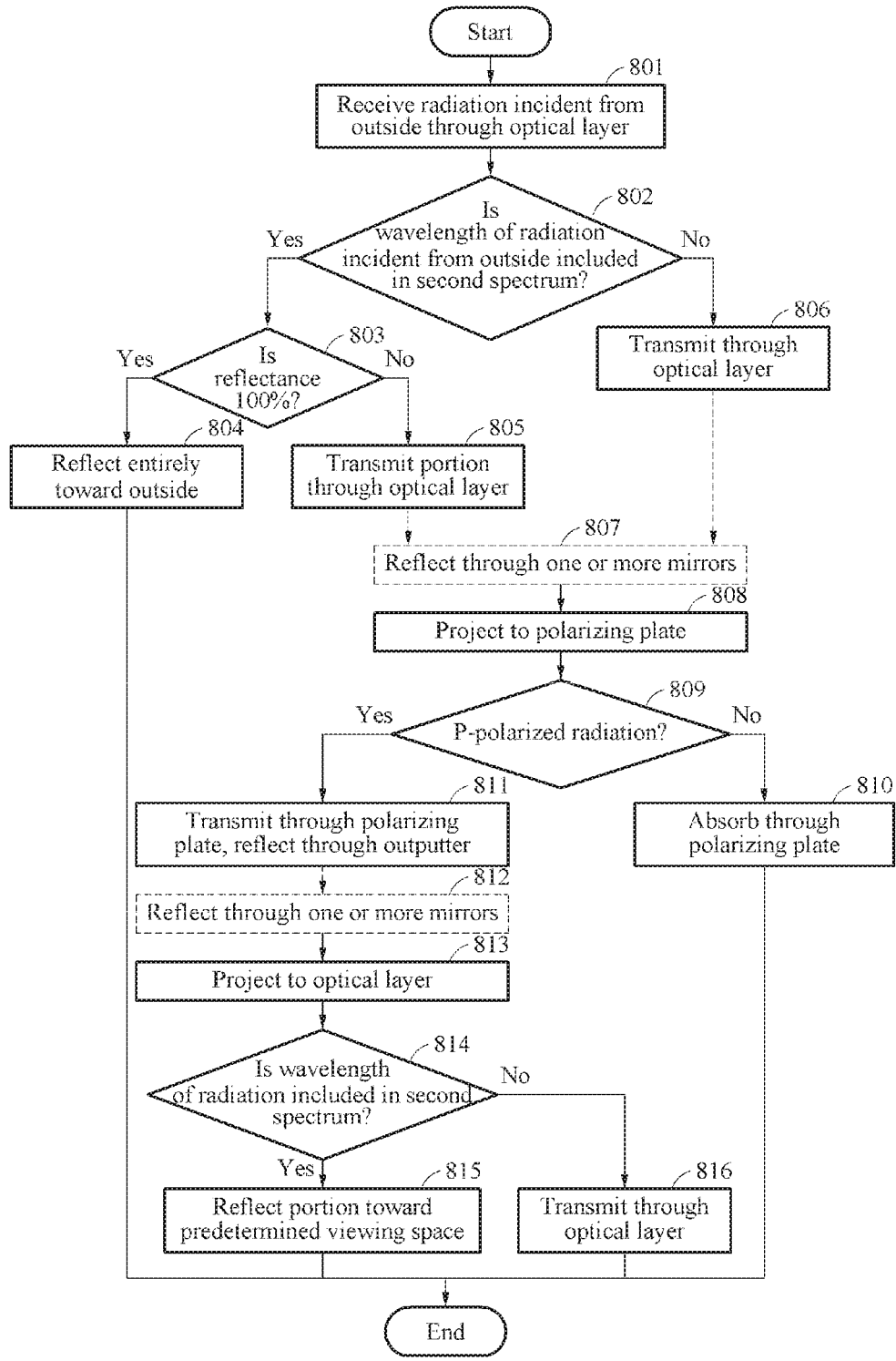

AUGMENTED REALITY (AR) DISPLAY APPARATUS AND METHOD

CROSS-REFERENCE TO RELATED APPLICATIONS

This application is based on and claims priority from U.S. Provisional Application No. 62/658,800 filed on Apr. 17, 2018 in the U.S. Patent and Trademark Office, Russian Patent Application No. 2018124648 filed on Jul. 5, 2018 in the Russian Federal Service for Intellectual Property, and Korean Patent Application No. 10-2019-0010957 filed on Jan. 29, 2019 in the Korean Intellectual Property Office, the disclosures of which are incorporated herein by reference in its entirety.

BACKGROUND

1. Field

Methods and apparatuses consistent with embodiments of the disclosure relate to augmented reality (AR) display apparatuses and methods thereof. More particularly, embodiments relate to apparatuses and methods for displaying a head-up display (HUD) for a vehicle using a polarizing plate and an optical layer.

2. Description of the Related Art

A head-up display (HUD) system may generate a virtual image in front of a driver and display information in the virtual image, thereby providing the user with a variety of information. The information provided to the driver may include, for example, navigation information and dashboard information such as a vehicle speed, a fuel level, and an engine revolution per minute (RPM). The driver may more easily recognize the information displayed in front without turning his or her gaze during driving, and thus, driving safety may improve. In addition to the navigation information and the dashboard information, the HUD system may also provide the driver with, for example, a lane indicator, a construction indicator, an accident indicator, a pedestrian detection indicator using augmented reality (AR), to assist with driving when a field of view is inadequate.

A light is a combination of an electric field and a magnetic field, and the electric field and the magnetic field oscillate in directions perpendicular to each other. When an oscillation direction of the electric field is perpendicular to an incidence plane, the light corresponds to an s-polarization. When the oscillation direction of the electric field is parallel to the incidence plane, the light corresponds to a p-polarization. When the light is incident from a medium to another medium, a portion of the light to be reflected and a portion of the light to be transmitted may be determined based on refractive indices of the two media and an incidence angle of the light. The portion of the light to be reflected and the portion of the light to be transmitted may be described through the Fresnel equation.

SUMMARY

One or more exemplary embodiments provide an augmented reality (AR) display apparatus utilizing a polarizing plate and an optical layer, the AR display apparatus that may transfer a p-polarized radiation including visual information output from an outputter to a viewing space such that a driver of a vehicle may view the visual information, for example, a head-up display (HUD) image.

One or more exemplary embodiments provide an AR display apparatus utilizing a polarizing plate and an optical layer, the AR display apparatus that may block a radiation incident from an outside not to be transferred to a predetermined viewing space. When a wavelength of the radiation incident from the outside is included in a spectrum to be reflected by an optical layer, and the radiation incident from the outside corresponds to a p-polarized radiation, at least 75% of the radiation incident from the outside may be blocked not to be transferred to the predetermined viewing space. When the wavelength of the radiation incident from the outside is not included in a spectrum in which an optical layer reflects at least a portion of received radiations, or when the radiation incident from the outside corresponds to an s-polarized radiation, the radiation incident from the outside may be entirely blocked not to be transferred to the predetermined viewing space.

According to an aspect of the disclosure, there is provided an augmented reality (AR) display apparatus, comprising: an outputter configured to output first radiation including visual information in a predetermined spectrum; a polarizing plate configured to absorb a first s-polarized radiation from the first radiation and transmit a first p-polarized radiation; and an optical layer configured to reflect at least a portion of the first p-polarized radiation incident on a first side of the optical layer with a wavelength corresponding to the predetermined spectrum.

The outputter may be further configured to output the first p-polarized radiation including the visual information such that the first p-polarized radiation including the visual information passes through the polarizing plate and is projected to the optical layer.

The optical layer may be further configured to reflect, into a predetermined viewing space, the at least a portion of the first p-polarized radiation with the wavelength corresponding to the predetermined spectrum, among the first p-polarized radiation passing through the polarizing plate.

The outputter may comprise: a display panel configured to display the visual information based on the predetermined spectrum; and a light source configured to provide a light to the display panel for displaying the visual information.

The first p-polarized radiation including the visual information may be incident at a predetermined threshold angle when projected to the optical layer.

The polarizing plate may be further configured to absorb a second s-polarized radiation, among a second radiation incident on a second side of the optical layer and passing through the optical layer.

A second p-polarized radiation, among a second radiation being incident on a second side of the optical layer and passing through the optical layer, may pass through the polarizing plate and is reflected by the outputter, and the second p-polarized radiation reflected by the outputter may pass through the polarizing plate and may be projected to the first side of the optical layer.

A first portion of the second p-polarized radiation with a wavelength corresponding to the predetermined spectrum, among the second p-polarized radiation being incident on the second side of the optical layer may be reflected by the optical layer, a second portion of the second p-polarized radiation with a wavelength other than the predetermined spectrum, among the second p-polarized radiation being incident on the second side of the optical layer may pass through the optical layer and the polarizing plate and may be reflected by the outputter, and the second portion of the second p-polarized radiation, reflected by the outputter, with the wavelength other than the predetermined spectrum may pass through the polarizing plate, is projected to the optical layer, and may pass through the optical layer, rather than being reflected by the optical layer.

The optical layer may be further configured to reflect the first p-polarized radiation with the wavelength corresponding to the predetermined spectrum based on a predetermined reflectance.

The predetermined spectrum may comprise a plurality of wavelengths, and the optical layer may have a different reflectance for each of the plurality of wavelengths.

The predetermined spectrum may comprise at least one of a radiation with a wavelength of red, a radiation with a wavelength of green, or a radiation with a wavelength of blue.

A reflectance of the optical layer may be determined based on a visibility required by the optical layer.

The optical layer may be further configured to reflect at least a portion of a second radiation with the wavelength corresponding to the predetermined spectrum among the second radiation being incident on a second side of the optical layer.

The optical layer may be further configured to reflect at least a portion of a second radiation with a wavelength of infrared, among the second radiation being incident on a second side of the optical layer.

The optical layer may be positioned between a windshield of a vehicle and an internal cover layer, outside of the windshield with respect to the vehicle, or inside of the internal cover layer with respect to the vehicle.

The optical layer may comprise at least one of a diffraction optical element (DOE) and a holographic optical element (HOE).

According to another aspect of the disclosure, there is provided an augmented reality (AR) display method, comprising: outputting, using an outputter, radiation including visual information in a predetermined spectrum; absorbing, using a polarizing plate, an s-polarized radiation from the radiation including visual information; transmitting, using the polarizing plate, a p-polarized radiation from the radiation including the visual information; and reflecting, using an optical layer, at least a portion of the p-polarized radiation passing through the polarizing plate into a predetermined viewing space.

The outputting may comprise outputting the p-polarized radiation including the visual information such that the p-polarized radiation including the visual information passes through the polarizing plate and is projected to the optical layer.

The reflecting may comprise reflecting, into the predetermined viewing space, the at least a portion of the p-polarized radiation with a wavelength corresponding to the predetermined spectrum, among the p-polarized radiation passing through the polarizing plate.

According to another aspect of the disclosure, there is provided an augmented reality (AR) display apparatus, comprising: a memory configured to store one or more instructions; a processor configured to execute the one or more instructions to: generate visual information; and control a display panel to output the visual information; the display panel configured to output radiation including the visual information in a predetermined spectrum; a polarizing plate configured to only transmit p-polarized radiation, among the radiation output from the display panel; and an optical layer configured to reflect at least a portion of the p-polarized radiation towards a viewing area.

The optical layer may be further configured to reflect the at least the portion of the p-polarized radiation with a wavelength corresponding to the predetermined spectrum towards the viewing area.

The AR display apparatus may further comprise an optical element configured to adjust a direction of the p-polarized radiation including the visual information to be incident to the optical layer at a predetermined angle.

According to another aspect of the disclosure, there is provided an augmented reality (AR) display apparatus, comprising: a windshield of a vehicle; and a multiband dichroic coating layer formed on the windshield of the vehicle, wherein the multiband dichroic coating is configured to: reflect a first spectrum of radiation incident on the multiband dichroic coating layer from outside the vehicle; pass through a second spectrum of the radiation incident on the multiband dichroic coating layer from outside the vehicle; and pass through p-polarized portion of the second spectrum of the radiation reflected inside the vehicle.

The multiband dichroic coating layer may be further configured to reflect at least a portion of a p-polarized radiation including visual information generated inside the vehicle towards a viewing area.

The AR display apparatus may further comprise: a coating layer, wherein the multiband dichroic coating layer is formed between the windshield and the coating layer.

BRIEF DESCRIPTION OF THE DRAWINGS

The above and/or other aspects will be more apparent by describing certain exemplary embodiments with reference to the accompanying drawings, in which:

FIG. 7 is a flowchart illustrating a propagation of a p-polarized radiation including visual information according to an exemplary embodiment; and FIG. 8 is a flowchart illustrating a propagation of a radiation incident from an outside according to an exemplary embodiment.

DETAILED DESCRIPTION

Figure 1:
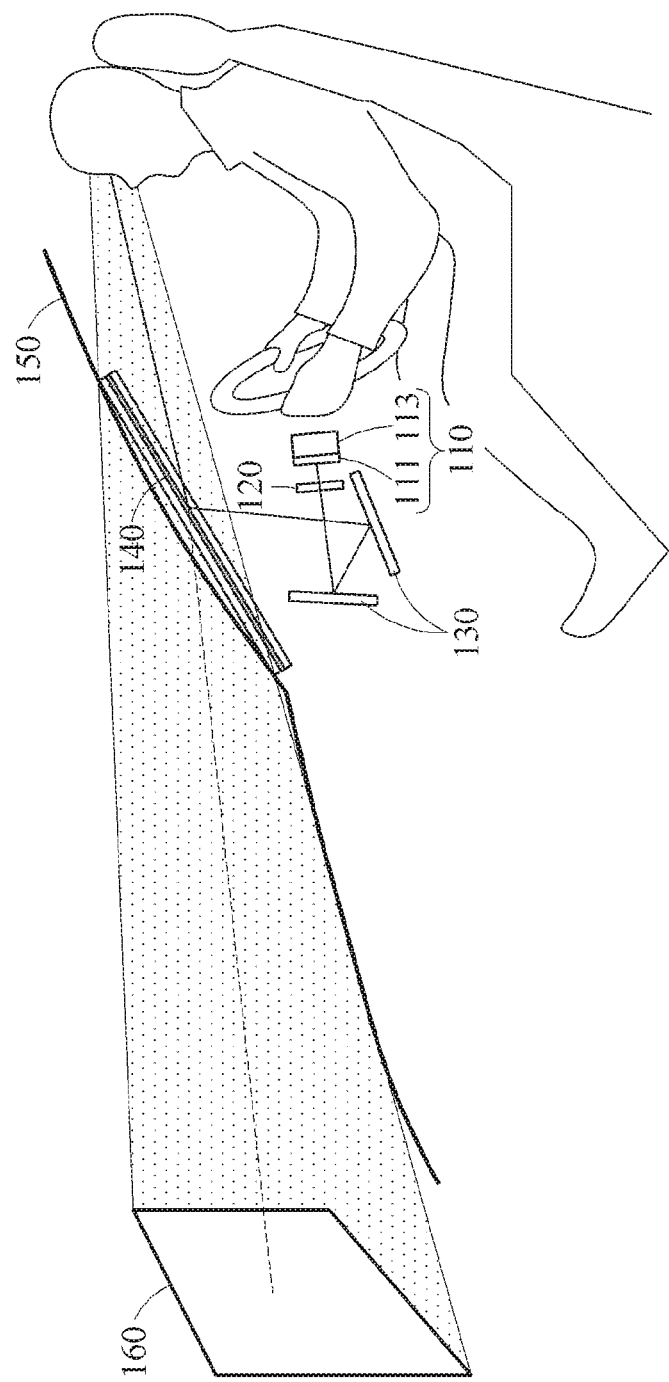
FIG. 1 illustrates an operation of a head-up display (HUD) device and a propagation of a p-polarized radiation including visual information according to an exemplary embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, wherein like reference numerals refer to the like elements throughout.

FIG. 1 illustrates an operation of a head-up display (HUD) device and a propagation of a p-polarized radiation including visual information according to an embodiment.

Referring to FIG. 1, a HUD device may include an outputter 110, a polarizing plate 120, and an optical layer 140. The outputter 110 may output a p-polarized image including visual information based on a predetermined spectrum. The polarizing plate 120 may absorb an s-polarized radiation and transmit a p-polarized radiation. The optical layer 140 may reflect at least a portion of a radiation of the predetermined spectrum.

For example, the optical layer 140 may reflect a p-polarized radiation with a wavelength within the predetermined spectrum. In this example, the p-polarized image output by the outputter 110 may pass through the polarizing plate 120, be incident to the optical layer 140, be reflected by the optical layer 140, and be provided to a user.

Issues occurring when visual information is provided using an s-polarized image may be solved by providing visual information using a p-polarized image, which will be described further below. For example, referring to FIG. 2, embodiments may be applicable to a HUD system of a vehicle to prevent a reflection of a sunlight incident from an outside of the vehicle into a user, for example, a driver. Further, referring to FIG. 6, a HUD image may be provided to a user, for example, a driver, wearing polarized sunglasses. In addition, there are various technical effects according to the exemplary embodiments, which will be described further below.

Referring to FIG. 1 again, the outputter 110 may include a display panel 111 and a light source 113. The display panel 111 may display a p-polarized HUD image including visual information based on a first spectrum, and the light source 113 may provide a white light to the display panel 111 to display the HUD image. According to an embodiment, the first spectrum is predetermined.

According to an embodiment, the outputter 110 may include a memory and a processor for generating the visual information. The memory may store instructions, which when executed by the processor may control the display panel and the light source. For example, the processor may control the display panel to output the visual information.

The first spectrum may be included in a second spectrum to be reflected by the optical layer 140. The first spectrum may include any one or any combination of a radiation with a wavelength of red, a radiation with a wavelength of green, and a radiation with a wavelength of blue. For example, the display panel 111 may display the HUD image using the radiation with the wavelength of red, or display the HUD image using the radiation with the wavelength of red, the radiation with the wavelength of green, and the radiation with the wavelength of blue together. For example, the second spectrum may include any one or any combination of a radiation with a wavelength of red, a radiation with a wavelength of green, and a radiation with a wavelength of infrared. By operating the display panel 111 and the light source 113 together, the outputter 110 including the display panel 111 and the light source 113 may output a p-polarized radiation including the visual information within the first spectrum.

The light source 113 may correspond to a light emitting diode (LED) light source or a laser light source. However, the type of the light source 113 is not limited thereto, and is not necessarily limited to a light source configured to provide a white light to the display panel 111. Hereinafter, for ease of description, examples in which the display panel 111 and the light source 113 are implemented as separate layers in the outputter 110, and the light source 113 is configured to provide a white light will be described. However, in some examples, the display panel 111 and the light source 113 of the outputter 110 may be implemented as a single layer, and the light source 113 may be configured to provide a light with a wavelength of a color other than white.

The radiation output from the outputter 110 may be projected to the polarizing plate 120. The polarizing plate 120 may have a characteristic of absorbing an s-polarized radiation and transmitting a p-polarized radiation. The radiation, including the visual information, output from the outputter 110 may have a p-polarization and thus, pass through the polarizing plate. When an entirety or a portion of the radiation output from the outputter 110 corresponds to an s-polarized radiation due to a design error or a malfunction of the outputter 110, the polarizing plate 120 may absorb the s-polarized radiation such that the radiation passing through the polarizing plate 120 may be a p-polarized radiation.

Further, the HUD device may further include one or more mirrors 130, and the optical layer 140 may be inserted into or attached to a windshield 150 of the vehicle.

The p-polarized radiation including the visual information may pass through the polarizing plate 120 and be projected to the one or more mirrors 130. The one or more mirrors 130 may include one or more plane mirrors, one or more convex mirrors, or combinations thereof. The one or more mirrors 130 may adjust a direction in which the p-polarized radiation including the visual information is reflected such that the radiation reflected by the one or more mirrors 130 may be incident to the optical layer 140 at a threshold angle, for example, Brewster's angle. According to an embodiment, the threshold angle may be a predetermined threshold angle. The threshold angle may include a predetermined angle range, which will be described in detail below. For example, referring to FIG. 3, there is an angle range in which only an s-polarized radiation is reflected, and a p-polarized radiation is transmitted based on an incidence angle at which the radiation is incident to the optical layer 140. The threshold angle may be construed as including the corresponding angle range.

When the one or more mirrors 130 include one or more convex mirrors, the convex mirrors may adjust a size of the HUD image to be displayed by the display panel 111 included in the outputter 110, thereby adjusting a size of, for example, enlarging, a HUD image to be viewed by the driver of the vehicle. However, adjusting the direction in which the p-polarized radiation including the visual information is projected and the size of the HUD image to be viewed by the driver of the vehicle appropriately may also be achieved through an appropriate design of the outputter 110. Thus, adjustment of the direction in which the p-polarized radiation including the visual information is projected and the size of the HUD image to be viewed by the driver of the vehicle may be achieved without the one or more mirrors 130 according to another embodiment. Hereinafter, for ease of description, examples in which the one or more mirrors 130 are included will be described. However, in some examples, the HUD device may not include the one or more mirrors 130.

Further description related to an incidence angle at which a p-polarized radiation including visual information is incident to the optical layer 140 will be provided below with reference to FIG. 3.

The optical layer 140 may reflect at least a portion of radiations received within a second spectrum. According to an embodiment, the second spectrum may be predetermined. The second spectrum may include the first spectrum used by the outputter 110. For example, when a wavelength corresponding to the first spectrum is a wavelength of red, a wavelength corresponding to the second spectrum may include the wavelength of red and a wavelength of infrared. The p-polarized radiation including the visual information output from the outputter 110 within the first spectrum may be incident to the optical layer 140 at a threshold angle, and at least a portion thereof may be reflected by the optical layer 140 into a viewing space. According to an embodiment, the threshold angle may be predetermined. The viewing space may be a space such that the driver of the vehicle may view the visual information. According to an embodiment, the viewing space may be predetermined.

A ratio of the radiation reflected by the optical layer 140 to the radiation incident to the optical layer 140 within the second spectrum may be a reflectance of the optical layer 140. The reflectance of the optical layer 140 may be determined based on a required visibility. For example, when the HUD image to be viewed by the driver of the vehicle needs to have a relatively high visibility, the optical layer 140 may be designed to have a reflectance of 80% with respect to a predetermined spectrum. Conversely, when the HUD image to be viewed by the driver of the vehicle needs to have a relatively low visibility, the optical layer 140 may be designed to have a reflectance of 30% with respect to a predetermined spectrum.

The optical layer 140 may be positioned between the windshield 150 of the vehicle and an internal cover layer, outside of the windshield 150 of the vehicle, or inside of the internal cover layer. The internal cover layer may be a glass layer positioned on an inner surface of the windshield 150 of the vehicle. Positioning the optical layer 140 between the windshield 150 of the vehicle and the internal cover layer may include inserting the optical layer 140 between glass of the windshield 150 of the vehicle and glass of the internal cover layer. Positioning the optical layer 140 outside of the windshield 150 of the vehicle may include attaching the optical layer 140 to an outer surface of the windshield 150 of the vehicle in the form of a film, and positioning the optical layer 140 inside of the internal cover layer may include attaching the optical layer 140 to an inner surface of the internal cover layer in the form of a film. Hereinafter, for ease of description, examples in which the optical layer 140 is positioned between the windshield 150 of the vehicle and the internal cover layer will be described. However, in some examples, the optical layer 140 may be implemented to be positioned in the other manners described above.

An operation of the optical layer 140 will be described further with reference to FIGS. 4 and 5.

When the p-polarized radiation including the visual information is reflected by the optical layer 140 into the viewing space, the driver of the vehicle may view the HUD image. The driver of the vehicle may view the HUD image as being positioned on a virtual image plane 160 in front of a field of view of the driver. The virtual image plane 160 may be positioned within a visibility range of the driver, and a position thereof may be determined such that a field of view for driving may not be obstructed. An appropriate position of the virtual image plane 160 may improve convenience of the driver and prevent a risk during driving, and may be achieved by an appropriate design of the HUD device.

An augmented reality (AR) display apparatus utilizing the polarizing plate and the optical layer according to an exemplary embodiment may transfer the p-polarized radiation including the visual information output from the outputter 110 to the viewing space such that the driver of the vehicle may view the visual information, for example, the HUD image.

Figure 2:
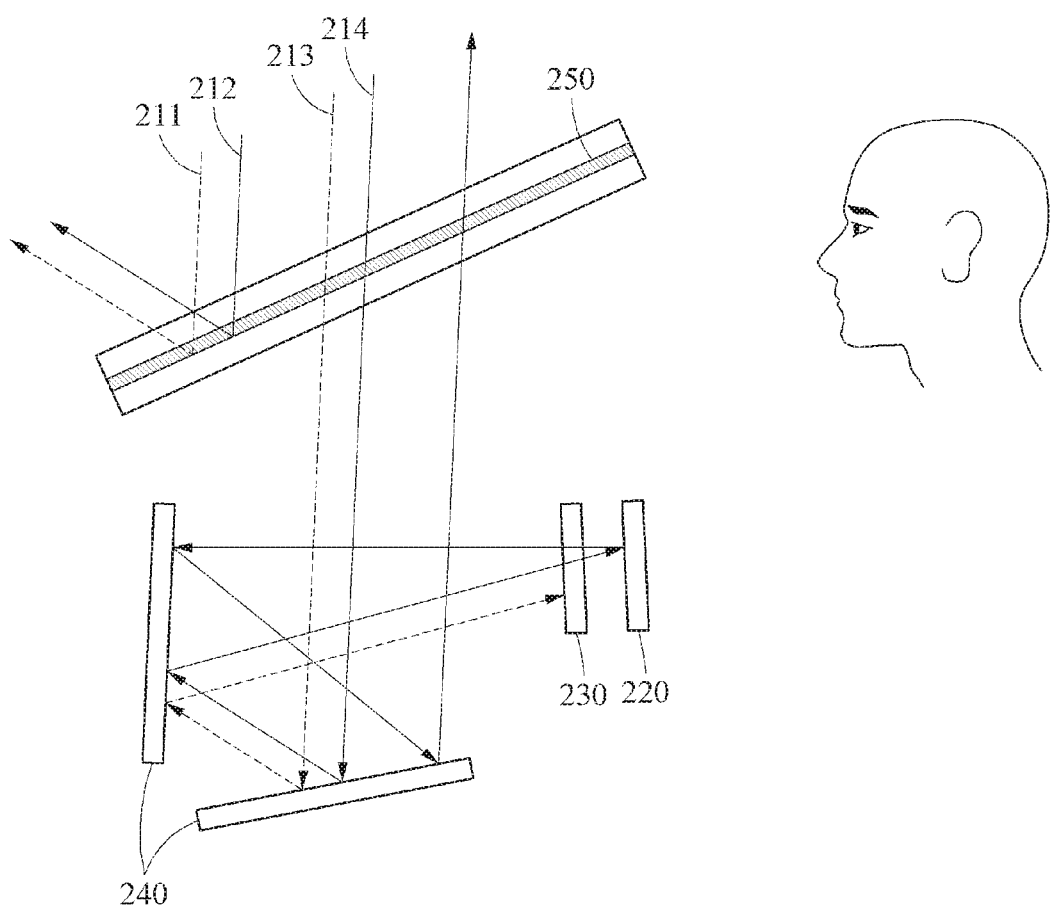
FIG. 2 illustrates propagations of radiations incident from an outside according to an exemplary embodiment.

FIG. 2 illustrates propagations of radiations incident from an outside according to an embodiment. An outputter 220 may correspond to the outputter 110 of FIG. 1, a polarizing plate 230 may correspond to the polarizing plate 120 of FIG. 1, one or more mirrors 240 may correspond to the one or more mirrors 130 of FIG. 1, and an optical layer 250 may correspond to the optical layer 140 of FIG. 1. In FIG. 2, broken lines may correspond to s-polarized radiations, and solid lines may correspond to p-polarized radiations.

Referring to FIG. 2, in a HUD system providing visual information using a p-polarized image, sunlight incident from an outside may not be reflected into a user. For example, when sunlight is incident to the optical layer 250, radiations 211 and 212 with wavelengths within a predetermined spectrum in the sunlight may be reflected. Radiations 213 and 214 of the other wavelengths may pass through the optical layer 250 and reach the polarizing plate 230. The s-polarized radiation 213 may be absorbed by the polarizing plate 230, and only the p-polarized radiation 214 may pass through the polarizing plate 230. The p-polarized radiation 214 may be reflected by the outputter 220 and inversely propagated to the optical layer 250. According to an embodiment, the optical layer 250 may be a multiband dichroic coating. The optical layer 250 may selectively reflect a radiation with a wavelength within a predetermined spectrum. Since the p-polarized radiation 214 has a wavelength other than the corresponding spectrum, the p-polarized radiation 214 may not be reflected by the optical layer 250, but pass through the optical layer 250. Thus, the sunlight incident from the outside may not be reflected into the user.

Meanwhile, in a HUD system providing visual information using an s-polarized image, an s-polarized radiation may be reflected by an outputter and inversely propagated to an optical layer. In this example, the s-polarized radiation may not have a wavelength within a spectrum designed to be reflected by the optical layer. However, referring to FIG. 3, at least a portion of the s-polarized radiation may be reflected by the optical layer at all times, and thus the portion of the s-polarized radiation may be reflected into the user. Accordingly, problems of hindering viewing of the HUD image, such as glare caused by the external sunlight, may occur.

Hereinafter, an operation of the HUD system providing visual information using a p-polarized image will be described in detail. The optical layer 250 may reflect at least a portion of radiations received within a second spectrum. The first radiation 211 may correspond to an s-polarized radiation, among radiations with wavelengths included in the second spectrum, the second radiation 212 may correspond to a p-polarized radiation, among the radiations with the wavelengths included in the second spectrum, the third radiation 213 may correspond to an s-polarized radiation, among radiations with wavelengths not included in the second spectrum, and the fourth radiation 214 may correspond to a p-polarized radiation, among the radiations with the wavelengths not included in the second spectrum.

The first radiation 211 and the second radiation 212 may have wavelengths included in the second spectrum, and thus at least a portion thereof may be reflected by the optical layer due to a property of the optical layer 250. When a reflectance of the optical layer 250 with respect to the second spectrum is 100%, the first radiation 211 and the second radiation 212 may be entirely reflected by the optical layer 250 and thus, may not reach a field of view of the driver at all. When the reflectance of the optical layer 250 is not 100%, a portion of the first radiation 211 and the second radiation 212 may pass through the optical layer 250. When a portion of the first radiation 211 and the second radiation 212 passes through the optical layer 250, a propagation of the first radiation 211 may be identical to a propagation of the third radiation 213 passing through the optical layer 250, and a propagation of the second radiation 212 may be mostly identical to a propagation of the fourth radiation 214 passing through the optical layer 250. Thus, an illustration of a propagation of light after a portion of the first radiation 211 and the second radiation 212 passes through the optical layer 250 was omitted.

The third radiation 213 and the fourth radiation 214 do not have wavelengths included in the second spectrum and thus, may not be reflected due to the property of the optical layer 250. A portion of a radiation propagated through the air outside of the vehicle and reaching the windshield of the vehicle may be reflected due to a change in a refractive index. However, the third radiation 213 and the fourth radiation 214 reflected into the outside due to the change in the refractive index may have no effect on the AR display apparatus, and thus propagations thereafter may not be considered. At least a portion of the third radiation 213 and the fourth radiation 214 not reflected into the outside due to the change in the refractive index may pass through the optical layer 250.

An example in which a portion of a radiation incident from an outside is reflected due to a change in a refractive index will be described further later with reference to FIG. 3.

The portion of the third radiation 213 and the fourth radiation 214 passing through the optical layer 250 may be projected to the one or more mirrors 240. The third radiation 213 and the fourth radiation 214 reflected by the one or more mirrors 240 may be projected to the polarizing plate 230. The polarizing plate 230 may have a characteristic of absorbing an s-polarized radiation and transmitting a p-polarized radiation. The third radiation 213 may correspond to an s-polarized radiation and thus, may be absorbed by the polarizing plate 230. The fourth radiation 214 may correspond to a p-polarized radiation and thus, may pass through the polarizing plate 230 and be projected to the outputter 220. When the radiation is incident to the outputter 220, the outputter 220 may act as a mirror. The fourth radiation 214 may be reflected by the outputter 220 and projected to the one or more mirrors 240. While the fourth radiation 214 is reflected by the outputter 220, the fourth radiation 214 may pass through the polarizing plate 230 again. However, the fourth radiation 214 may correspond to a p-polarized radiation and thus, a propagation thereof may not be affected.

The fourth radiation 214 reflected by the outputter 220 may be projected to the one or more mirrors 240. The one or more mirrors 240 may adjust a direction of the radiation reflected by the outputter 220 such that the radiation reflected by the one or more mirrors 240 may be incident to the optical layer 250 at a threshold angle.

The example of adjusting an angle at which the radiation is incident to the optical layer 250 will be described further with reference to FIG. 3.

The fourth radiation 214 reflected by the one or more mirrors 240 again may be projected to the optical layer 250. The optical layer 250 may reflect at least a portion of radiations received within the second spectrum.

The fourth radiation 214 does not have a wavelength included in the second spectrum and thus, may not be reflected due to the property or the characteristics of the optical layer 250. Since the fourth radiation 214 is incident to the optical layer 250 at the threshold angle, and the fourth radiation 214 corresponds to a p-polarized radiation, a reflection coefficient on a boundary surface between the air inside of the vehicle and the internal cover layer may be "0". Thus, the entirety of the fourth radiation 214 propagated inside of the vehicle and reaching the cover layer may not be reflected despite a change in the refractive index, pass through the optical layer 250, and be propagated toward the outside, thereby not being reflected into a viewing space. According to an embodiment, the viewing space is predetermined.

Meanwhile, when a portion of the second radiation 212 passes through the optical layer 250 from the outside into the vehicle, at least a portion of the second radiation 212 may be reflected by the optical layer due to the property or the characteristics of the optical layer 250 since the second radiation 212 has a wavelength included in the second spectrum. Thus, the portion of the second radiation 212 may be reflected by the optical layer 250 into the viewing space. If a reflectance of the optical layer 250 with respect to a wavelength included in the second spectrum is denoted as R (for ease of understanding, the reflectance being set as an index value between "0" and "1", rather than a percent value), up to (1-R) of the second radiation incident from the outside may pass through the optical layer 250. Further, R of the second radiation reflected by the one or more mirrors 240 may be reflected by the optical layer 250 into the viewing space. Thus, up to R×(1-R) of the second radiation incident from the outside may pass through the optical layer 250. R×(1-R) may have a maximum value of 0.25 if R=0.5. Thus, when the reflectance is not "1", up to ¼ of the second radiation may be reflected into the viewing space.

An AR display apparatus utilizing a polarizing plate and an optical layer may block a radiation incident from an outside not to be transferred to a viewing space. For example, when a wavelength of the radiation incident from the outside is included in a spectrum to be reflected by the optical layer, and the radiation incident from the outside corresponds to a p-polarized radiation, at least 75% of the radiation incident from the outside may be blocked not to be transferred to the viewing space. When the wavelength of the radiation incident from the outside is not included in the spectrum in which at least a portion of received radiations is reflected by the optical layer, or when the radiation incident from the outside corresponds to an s-polarized radiation, the entirety of the radiation incident from the outside may be blocked not to be transferred to the viewing space.

Figure 3:
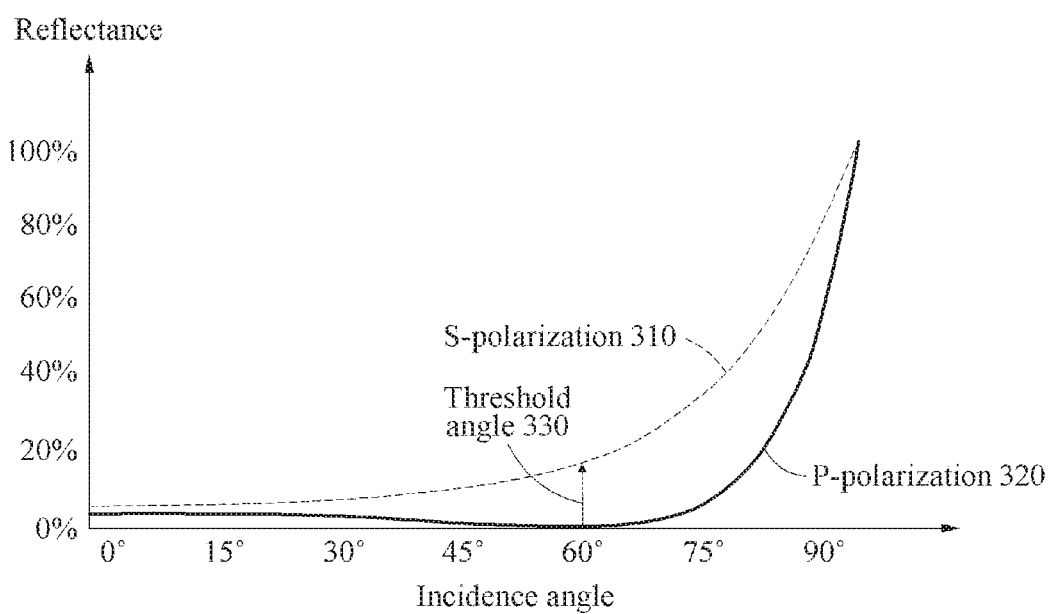
FIG. 3 illustrates a reflectance with respect to an incidence angle and a polarization of a radiation incident to a medium with a different refractive index according to an exemplary embodiment.

FIG. 3 illustrates a reflectance with respect to an incidence angle and a polarization of a radiation incident to a medium with a different refractive index according to an exemplary embodiment.

Referring to FIG. 3, when a light is incident from a medium to another medium with a different refractive index, a portion of the light may be reflected on a surface due to a difference between refractive indices of the two substances. A degree of reflection of the light on the surface may be determined based on a polarization of a radiation, and an angle at which the light is incident to a boundary surface of the two media. A graph of FIG. 3 shows a reflectance with respect to an incidence angle when a radiation is incident from the air with a relatively small refractive index, for example, 1.0, to glass with a relatively great refractive index, for example, 1.5. According to the graph, a reflectance with respect to a p-polarized radiation 320 at a threshold angle 330, for example, Brewster's angle $$= \tan^{-1}\frac{1.5}{1} \approx 56.3°$$

may be close to "0", and a reflectance with respect to an s-polarized radiation may be about 20%. Thus, by adjusting the incidence angle of the radiation incident to the optical layer to be the threshold angle 330, the p-polarized radiation 320 may be transmitted, without being reflected. Hereinafter, some portions of the exemplary embodiments described with reference to FIGS. 1 and 2 will be described further.

In FIG. 1, the one or more mirrors 130 may adjust a direction in which the p-polarized radiation 320 including the visual information is reflected, such that the radiation reflected by the one or more mirrors 130 may be incident to the optical layer 140 at an incidence angle corresponding to the threshold angle 330. In another example, through an appropriate design of the outputter 110, the radiation may be incident to the optical layer 140 at an incidence angle corresponding to the threshold angle 330, without using the one or more mirrors 130.

The optical layer 140 may reflect at least a portion of radiations received within the second spectrum, and the second spectrum may include the first spectrum used by the outputter 110.

When the optical layer 140 is positioned between the windshield 150 of the vehicle and the internal cover layer, the reflectance coefficient on the boundary surface between the air inside of the vehicle and the internal cover layer may be "0", and thus the radiation may be transmitted, without being reflected. However, due to the property of the optical layer 140, at least a portion of the radiation may be reflected. Even when the optical layer 140 is positioned outside of the windshield 150 of the vehicle, the reflectance coefficient on the boundary surface between the air inside of the vehicle and the internal cover layer may be "0", and thus the radiation may be transmitted, without being reflected. However, due to the property of the optical layer 140, at least a portion of the radiation may be reflected by the optical layer 140. When the optical layer 140 is positioned inside of the internal cover layer, the radiation may first reach the optical layer 140 before reaching the internal cover layer, and at least a portion of the radiation may be reflected due to the property of the optical layer 140.

In FIG. 1, even assuming that the p-polarized radiation 320 including the visual information is incident to the optical layer 140 at an incidence angle other than the threshold angle 330, at least a portion of the radiation may be reflected by the optical layer 140. However, when the incidence angle at which the p-polarized radiation 320 is incident to the optical layer 140 is not adjusted to be the threshold angle 330, reflection coefficients of the optical layer 140 and the boundary surface between the air inside of the vehicle and the internal cover layer may not be "0". In this example, the p-polarized radiation 320 including the information may be divided into two and reflected into the viewing space, and thus the driver of the vehicle may view an unclear HUD image or two overlapping HUD images, which decreases the visibility. This may bring about a risk during driving and cause inconvenience of the driver. Thus, the incidence angle at which the p-polarized radiation 320 is incident to the optical layer 140 may be adjusted to be the threshold angle 330.

In FIG. 2, the radiation incident from the outside may be incident to the windshield of the vehicle and the optical layer 250 at various incidence angles. The third radiation 213 and the fourth radiation 214 do not have wavelengths included in the second spectrum and thus, may not be reflected due to the property of the optical layer 250. Referring to FIG. 3, the third radiation 213 may have an s-polarization 310, and be reflected due to a change in a refractive index when incident to the windshield.

When the outputter configured to output a p-polarized radiation and the polarizing plate configured to absorb an s-polarized radiation are used, it is possible to prevent a p-polarized radiation incident from an outside from obstructing a field of view of the driver. For example, the fourth radiation 214 of FIG. 2 does not have a wavelength included in the second spectrum and thus, may not be reflected due to the property of the optical layer 250. Since the fourth radiation 214 is incident to the optical layer 250 at the incidence angle corresponding to the threshold angle, and the fourth radiation 214 corresponds to the p-polarized radiation 320, the reflection coefficient on the boundary surface between the air inside of the vehicle and the internal cover layer may be "0". Thus, the radiation propagated inside of the vehicle and reaching the cover layer may not be reflected despite a change in the refractive index. Thus, the entirety of the fourth radiation 214 may pass through the optical layer 250 and be propagated toward the outside, thereby not being reflected into the viewing space.

FIGS. 4A through 4E illustrate examples of a spectrum of wavelengths of radiations reflected by an optical layer according to an exemplary embodiment.

Figure 4A:
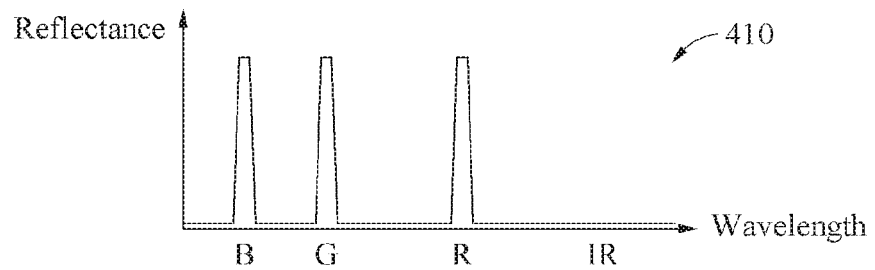
FIGS. 4A through 4E illustrate examples of a spectrum of wavelengths of radiations reflected by an optical layer according to an exemplary embodiment.
Figure 4B:
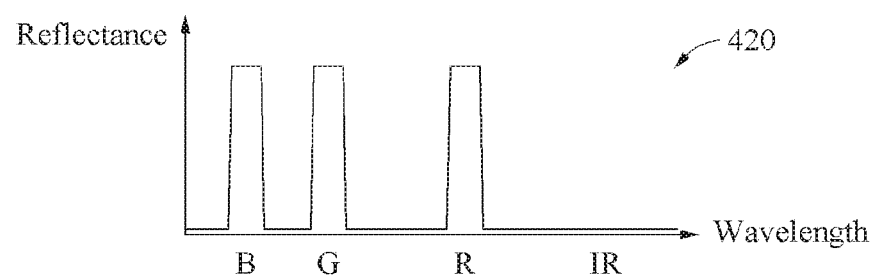
Figure 4C:
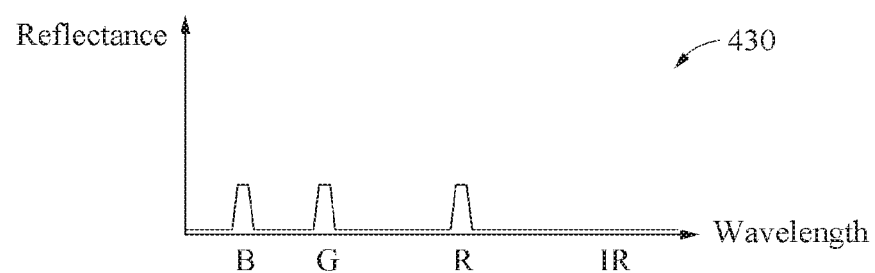
Figure 4D:
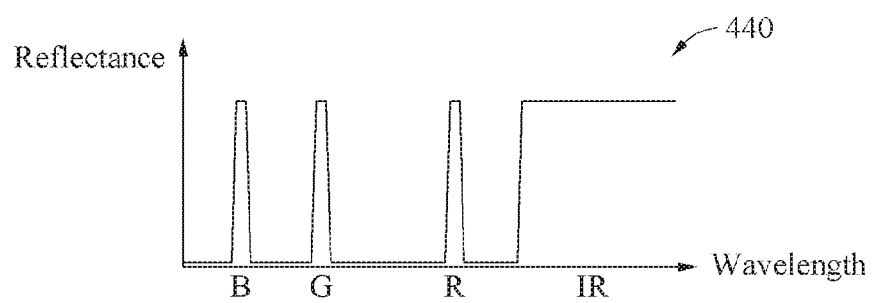
Figure 4E:
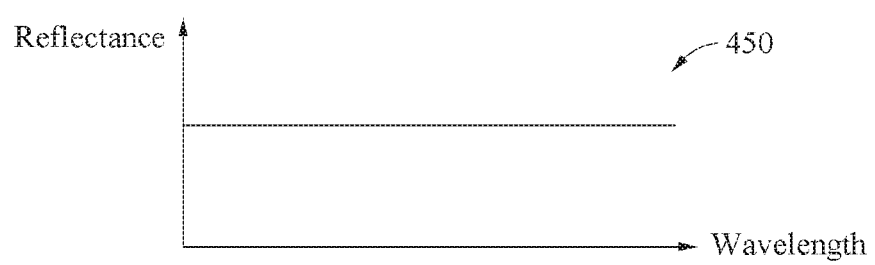

Referring to FIGS. 4A through 4E, an optical layer may reflect at least a portion of radiations received within a second spectrum, and the second spectrum may include a first spectrum used by an outputter. Each one of a graph 410 of FIG. 4A, a graph 420 of FIG. 4B, a graph 430 of FIG. 4C, a graph 440 of FIG. 4D and a graph 450 of FIG. 4E shows a possible range of the second spectrum and a possible reflectance. In the graphs 410 through 450, B denotes a wavelength of blue, G denotes a wavelength of green, and R denotes a wavelength of red.

The second spectrum may include at least a portion of the wavelength of blue, the wavelength of green, and the wavelength of red. For ease of description, the graph 410 of FIG. 4A illustrates the second spectrum including all the wavelength of blue, the wavelength of green, and the wavelength of red. However, the second spectrum may include only a portion of the wavelength of blue, the wavelength of green, and the wavelength of red. However, considering that the outputter outputs a radiation including visual information, a radiation to be reflected into a viewing space needs to have a visibility. Thus, the predetermined second spectrum may include at least a portion of the wavelength of blue, the wavelength of green, and the wavelength of red.

When the second spectrum includes at least a portion of the wavelength of blue, the wavelength of green, and the wavelength of red, a range of each wavelength included in the second spectrum may be determined in various manners. For example, ranges of wavelengths included in the second spectrum with respect to the wavelength of blue, the wavelength of green, and the wavelength of red in the graph 420 of FIG. 4B may be relatively wider than ranges of wavelengths included in the second spectrum with respect to the wavelength of blue, the wavelength of green, and the wavelength of red in the graph 410 of FIG. 4A.

The reflectance with respect to the second spectrum may be determined in various manners. The reflectance with respect to the second spectrum may be determined based on a required visibility. For example, a reflectance of the optical layer with respect to the second spectrum in the graph 430 of FIG. 4C may be relatively less than a reflectance of the optical layer with respect to the second spectrum in the graph 410 of FIG. 4A.

The second spectrum may include another wavelength, in addition to the wavelength of blue, the wavelength of green, and the wavelength of red. For example, in the graph 440 of FIG. 4D, the second spectrum may include the wavelength of blue, the wavelength of green, the wavelength of red, and a wavelength of infrared. When a radiation with the wavelength of infrared, among radiations incident from an outside, is incident to an inside of the vehicle, the temperature inside of the vehicle may increase due to infrared radiation. Thus, when the second spectrum includes the wavelength of infrared, the increase in the temperature inside of the vehicle caused by infrared radiation may be reduced or prevented. For example, in the graph 450 of FIG. 4E, the second spectrum may include all wavelengths. However, when the second spectrum includes all wavelengths, radiations incident from the outside may be substantially all reflected by the optical layer if the reflectance is close to "1", such that the driver may not secure a field of view with respect to an outside environment. Thus, the reflectance may be determined to be a value less than "1", for example, "0.5".

Figure 5:
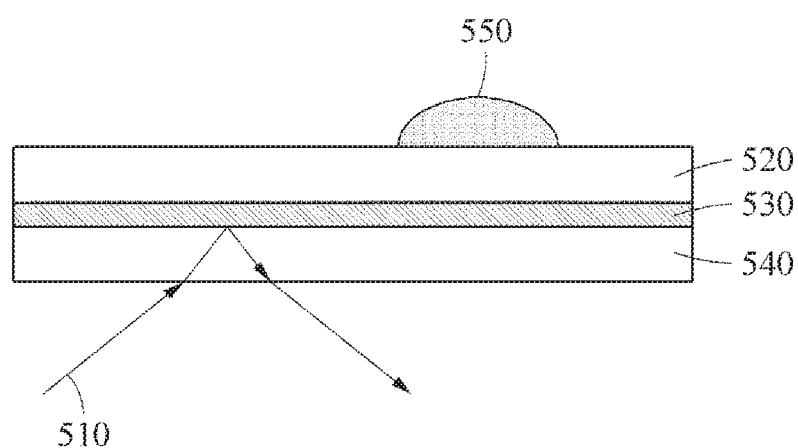
FIG. 5 illustrates an operation of an optical layer according to an exemplary embodiment.

FIG. 5 illustrates an operation of an optical layer according to an exemplary embodiment.

Referring to FIG. 5, when a p-polarized radiation 510 including visual information output from an outputter is incident to an internal cover layer 540 at an incidence angle corresponding to a threshold angle, a reflection coefficient on a boundary surface between the air inside of a vehicle and the internal cover layer 540 may be "0". Thus, a radiation propagated inside of the vehicle and reaching the cover layer may not be reflected despite a change in a refractive index.

When a radiation 510 passing through the internal cover layer 540 is incident to an optical layer 530, at least a portion of the radiation 510 with a wavelength included in the second spectrum may be reflected due to a property or a characteristics of the optical layer 530. When a reflectance of the optical layer 530 with respect to the second spectrum is 100%, the radiation 510 with the wavelength included in the second spectrum may be entirely reflected. When the reflectance of the optical layer 530 with respect to the second spectrum is not 100%, a portion of the radiation 510 may pass through the optical layer 530 and be propagated. When an incidence angle at which the radiation 510 is incident to the internal cover layer 540 corresponds to a threshold angle, and the radiation 510 is incident from the air inside of the vehicle, the air with a relatively small refractive index, to the internal cover layer with a relatively great refractive index, a refraction angle may be less than the incidence angle. Since a refraction angle when the radiation 510 is incident from the air inside of the vehicle to the internal cover layer 540 corresponds to an incidence angle at which the radiation 510 is incident from the windshield 520 of the vehicle to the air outside of the vehicle, the incidence angle at this time may correspond to the threshold angle, and the reflection coefficient on the boundary surface may be "0". Thus, a radiation propagated through the windshield 520 of the vehicle and reaching the boundary surface between the windshield 520 of the vehicle and the air outside of the vehicle may not be reflected, despite the change in the refractive index. That is, even when the reflectance of the optical layer 530 with respect to the second spectrum is not 100%, the reflection may occur only on the optical layer 530. When the reflection occurs only on the optical layer 530, the radiation 510 may not be divided into two and reflected, an unclear HUD image or two overlapping HUD images viewed by the driver of the vehicle may be prevented.

When the reflectance of the optical layer 530 is 100%, the p-polarized radiation 510, among radiations with wavelengths included in the second spectrum, may be entirely reflected by the optical layer 530. Thus, the radiation 510 may not be affected by a foreign substance 550, such as water, ice, or mud, existing outside of the windshield 520 of the vehicle. Conversely, when the reflectance of the optical layer 530 is not 100%, a portion of the radiation 510 may reach a boundary surface between the windshield 520 of the vehicle and the foreign substance 550. In this example, a radiation may be reflected by the foreign substance. When the radiation is reflected by the foreign substance, the radiation 510 may be divided into two and reflected, the driver of the vehicle may view an unclear HUD image or two overlapping HUD images, which decreases the visibility. However, when the reflectance of the optical layer 530 is denoted as R, up to (1-R) of the radiation 510 incident from the air inside of the vehicle to the internal cover layer 540 may pass through the optical layer 530, and up to (1-R) of the radiation reflected by the foreign substance may pass through the optical layer 530 again. Thus, up to $(1-R)^2$ of the radiation 510 incident to the cover layer 540 may be reflected by the foreign substance. Thus, as R is a value closer to "1", double reflection by the foreign substance may be reduced.

For ease of description, the exemplary embodiments in which the optical layer 530 is implemented to be positioned between the windshield 520 of the vehicle and the internal cover layer 540 have been described above. However, in some examples, the optical layer may be positioned outside of the windshield 520 of the vehicle, or positioned inside of the internal cover layer 540. Even in those examples, when the p-polarized the radiation 510, among the radiations with wavelengths included in the second spectrum, is incident at an incidence angle corresponding to a threshold angle, the reflection may not occur on the internal cover layer 540 and the windshield 520 of the vehicle, and the reflection may occur only on the optical layer 530. Further, even in a case of double reflection by the foreign substance 550 existing outside of the windshield 520 of the vehicle, the radiation 510 may identically pass through the optical layer 530 two times. Thus, the above description may also apply to exemplary embodiments in which the optical layer is positioned outside of the windshield 520 of the vehicle or inside of the internal cover layer 540.

Figure 6:
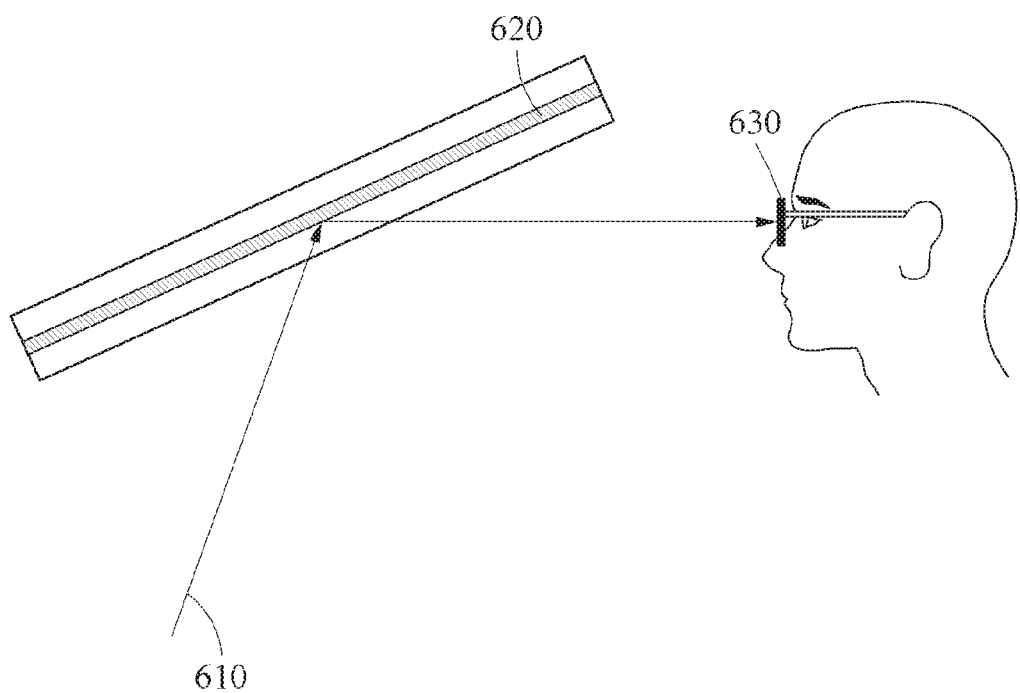
FIG. 6 illustrates a visibility of a HUD image when polarizing glasses are worn according to an exemplary embodiment.

FIG. 6 illustrates a visibility of a HUD image when polarizing glasses are worn according to an exemplary embodiment. When an outputter of a HUD system is based on a liquid crystal display (LCD), a polarization direction of polarizing glasses, for example, polarizing sunglasses, is orthogonal to a polarization direction of the LCD such that a user may not view a HUD image. According to an exemplary embodiment, by providing visual information using a p-polarized image, the HUD image may be provided even to a user wearing polarizing glasses.

Referring to FIG. 6, when a p-polarized radiation 610 including visual information output from the outputter is incident to an internal cover layer or an optical layer 620 at an incidence angle corresponding to a threshold angle, a reflection coefficient on a boundary surface between the air inside of a vehicle and the internal cover layer may be "0". Thus, the radiation 610 may not be reflected by the internal cover layer. The p-polarized radiation 610 including the visual information output from the outputter may have a wavelength included in a first spectrum, and the first spectrum may be included in a second spectrum. That is, the radiation 610 may have a wavelength included in the second spectrum. When the radiation 610 passing through the internal cover layer is incident to the optical layer 620, at least a portion of the radiation 610 with the wavelength included in the second spectrum may be reflected due to a property of the optical layer 620.

A driver may wear p-polarizing glasses 630 to prevent glare during driving, thereby improving convenience and preventing a risk during driving. The radiation 610 including the visual information output from the outputter corresponds to a p-polarized radiation and thus, may pass through polarizing lenses of the p-polarizing glasses 630. Thus, even when the driver wears the p-polarizing glasses 630, a visibility of a HUD image may be secured. The p-polarizing glasses 630 may include, for example, polarizing sunglasses.

FIG. 7 is a flowchart illustrating a propagation of a p-polarized radiation including visual information according to an exemplary embodiment.

Referring to FIG. 7, in operation 710, an outputter outputs a p-polarized radiation including visual information. Operation 710 may be performed by the outputter 110 of FIG. 1. In operation 720, the output radiation may pass through a polarizing plate configured to transmit a p-polarized radiation and absorb an s-polarized radiation. Operation 720 may be performed by the polarizing plate 120 of FIG. 1. In operation 725, the radiation passing through the polarizing plate may be reflected by one or more mirrors. The one or more mirrors may appropriately adjust a direction in which the radiation is to be projected and a size of a HUD image to be viewed by a driver of a vehicle, which, however, may also be achieved through an appropriate design of the outputter. Thus, the one or more mirrors are not necessarily essential to achieve the foregoing. Operation 725 may be performed by the one or more mirrors 130 of FIG. 1. In operation 730, at least a portion of the radiation reflected by the one or more mirrors, for example, the radiation passing through polarizing plate if the radiation is not reflected by the one or more mirrors, may be reflected by an optical layer into a viewing space. Operation 730 may be performed by the optical layer 140 of FIG. 1.

FIG. 8 is a flowchart illustrating a propagation of a radiation incident from an outside according to an exemplary embodiment.

Referring to FIG. 8, in operation 801, a radiation incident from an outside may be received through an optical layer. When a wavelength of the radiation incident from the outside is included in a second spectrum in operation 802, a propagation of the radiation may change based on whether a reflectance of the optical layer is 100% in operation 803. When the wavelength of the radiation incident from the outside is included in the second spectrum, the radiation may correspond to the first radiation 211 and the second radiation 212 of FIG. 2. If the reflectance of the optical layer is 100%, the radiation may be entirely reflected into the outside, in operation 804. When the reflectance of the optical layer is not 100%, a portion of the radiation may be reflected into the outside, and a remaining portion thereof may pass through the optical layer, in operation 805.

When the wavelength of the radiation incident from the outside is not included in the second spectrum in operation 802, the radiation may pass through the optical layer, in operation 806. When the wavelength of the radiation incident from the outside is not included in the second spectrum, the radiation may correspond to the third radiation 213 and the fourth radiation 214 of FIG. 2. In operation 807, the radiation passing through the optical layer in operation 805, 806 may be reflected by one or more mirrors. In operation 808, the radiation reflected by the one or more mirrors may be projected to a polarizing plate. When the radiation is an s-polarized radiation in operation 809, the s-polarized radiation may be absorbed by the polarizing plate, in operation 810. The s-polarized radiation may correspond to the first radiation 211 and the third radiation 213 of FIG. 2. When the radiation is a p-polarized radiation in operation 809, the p-polarized radiation may pass through the polarizing plate and be reflected by the outputter, in operation 811. The p-polarized radiation may correspond to the second radiation 212 and the fourth radiation 214 of FIG. 2. In operation 812, the radiation reflected by the outputter may be reflected by the one or more mirrors. However, when the polarizing plate and the outputter are appropriately designed, the one or more mirrors are not necessarily essential. Thus, in some examples, operations 807 and 812 may be omitted.

In operation 813, the radiation reflected by the one or more mirrors, for example, the radiation passing through the polarizing plate if the radiation is not reflected by the one or more mirrors, may be projected to the optical layer. When a wavelength of the radiation projected to the optical layer is included in the second spectrum in operation 814, a portion of the radiation may be reflected into a viewing space, in operation 815. When the wavelength of the radiation projected to the optical layer is included in the second spectrum, the radiation may correspond to the second radiation 212 of FIG. 2. When the wavelength of the radiation is included in the second spectrum, operation 803 may have been performed after operation 802 is performed. Thus, to perform operation 815, operation 807 should be performed after operation 805 is performed. That is, operation 805 may be performed only when the reflectance of the optical layer is not 100%. Thus, in operation 815, not "at least a portion", but rather "a portion" of the radiation may be reflected into the viewing space. When the wavelength of the radiation projected to the optical layer is not included in the second spectrum in operation 814, the radiation may pass through the optical layer, in operation 816. When the wavelength of the radiation projected to the optical layer is not included in the second spectrum, the radiation may correspond to the fourth radiation 214 of FIG. 2.

The exemplary embodiments described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An augmented reality (AR) display apparatus, comprising:
    an outputter configured to output first radiation including visual information in a predetermined spectrum;
    a polarizing plate configured to absorb a first s-polarized radiation from the first radiation and transmit a first p-polarized radiation; and
    an optical layer configured to reflect at least a first portion of the first p-polarized radiation incident on a first side of the optical layer having a first wavelength corresponding to the predetermined spectrum, and pass through at least a second portion of the first p-polarized radiation having a second wavelength different from the first wavelength,
    wherein the optical layer is further configured to:
        receive a second p-polarized radiation, among a second radiation being incident on a second side of the optical layer, the second radiation being external to the AR device,
        pass a first portion of the second p-polarized radiation to the polarizing plate, and
        receive the first portion of the second p-polarized radiation on the first side of the optical layer after the second p-polarized radiation is reflected by the outputter.

2. The AR display apparatus of claim 1, wherein the outputter is further configured to output the first p-polarized radiation including the visual information such that the first p-polarized radiation including the visual information passes through the polarizing plate and is projected to the optical layer.

3. The AR display apparatus of claim 1, wherein the optical layer is further configured to reflect, into a predetermined viewing space, the at least a portion of the first p-polarized radiation with the first wavelength corresponding to the predetermined spectrum, among the first p-polarized radiation passing through the polarizing plate.

4. The AR display apparatus of claim 1, wherein the outputter comprises:
    a display panel configured to display the visual information based on the predetermined spectrum; and
    a light source configured to provide a light to the display panel for displaying the visual information.

5. The AR display apparatus of claim 1, wherein the first p-polarized radiation including the visual information is incident at a predetermined threshold angle when projected to the optical layer.

6. The AR display apparatus of claim 1, wherein the polarizing plate is further configured to absorb a second s-polarized radiation, among a second radiation incident on a second side of the optical layer and passing through the optical layer.

7. The AR display apparatus of claim 1, wherein the second p-polarized radiation passes through the polarizing plate and before being reflected by the outputter, and
the second p-polarized radiation reflected by the outputter passes through the polarizing plate and is projected to the first side of the optical layer.

8. The AR display apparatus of claim 7, wherein a second portion of the second p-polarized radiation with the first wavelength corresponding to the predetermined spectrum, among the second p-polarized radiation being incident on the second side of the optical layer is reflected by the optical layer,
the first portion of the second p-polarized radiation with the second wavelength other than the predetermined spectrum, among the second p-polarized radiation being incident on the second side of the optical layer passes through the optical layer and the polarizing plate and is reflected by the outputter, and
the first portion of the second p-polarized radiation, reflected by the outputter, with the second wavelength other than the predetermined spectrum passes through the polarizing plate, is projected to the optical layer, and passes through the optical layer, rather than being reflected by the optical layer.

9. The AR display apparatus of claim 1, wherein the optical layer is further configured to reflect the first p-polarized radiation with the first wavelength corresponding to the predetermined spectrum based on a predetermined reflectance.

10. The AR display apparatus of claim 1, wherein the predetermined spectrum comprises a plurality of wavelengths, and
the optical layer has a different reflectance for each of the plurality of wavelengths.

11. The AR display apparatus of claim 1, wherein the predetermined spectrum comprises at least one of a radiation with a wavelength of red, a radiation with a wavelength of green, or a radiation with a wavelength of blue.

12. The AR display apparatus of claim 1, wherein a reflectance of the optical layer is determined based on a visibility required by the optical layer.

13. The AR display apparatus of claim 1, wherein the optical layer is further configured to reflect at least a portion of a second radiation with the first wavelength corresponding to the predetermined spectrum among the second radiation being incident on a second side of the optical layer.

14. The AR display apparatus of claim 1, wherein the optical layer is further configured to reflect at least a portion of a second radiation with an infrared wavelength, among the second radiation being incident on a second side of the optical layer.

15. The AR display apparatus of claim 1, wherein the optical layer is positioned between a windshield of a vehicle and an internal cover layer, outside of the windshield with respect to the vehicle, or inside of the internal cover layer with respect to the vehicle.

16. The AR display apparatus of claim 1, wherein the optical layer comprises at least one of a diffraction optical element (DOE) and a holographic optical element (HOE).

17. The AR display apparatus of claim 1,
wherein the optical layer is configured to:
reflect a first portion of the second p polarized radiation with the first wavelength corresponding to the predetermined spectrum, among the second p-polarized radiation being incident on the second side of the optical layer, and
pass through a second the first portion of the second p-polarized radiation with the second wavelength other than the predetermined spectrum, among the second p-polarized radiation being incident on the second side of the optical layer passes through the optical layer towards the outputter,
wherein the outputter is configured to reflect the first portion of the second p-polarized radiation with the second wavelength towards the optical layer, and
wherein the optical layer is configured to pass the first portion of the second p-polarized radiation with the second wavelength reflected by the outputter to the outside.

18. The AR display apparatus of claim 1, wherein the optical layer is provided on a first location on a windshield of a vehicle, and
wherein the polarizing plate is provided at a second location separated from the optical layer and the windshield of the vehicle.

19. An augmented reality (AR) display method of an AR device, the method comprising:
outputting, using an outputter, radiation including visual information in a predetermined spectrum;
absorbing, using a polarizing plate, an s-polarized radiation from the radiation including the visual information;
transmitting, using the polarizing plate, a first p-polarized radiation from the radiation including the visual information;
receiving the first p-polarized radiation on a first side of an optical layer;
reflecting, using the optical layer, at least a first portion of the first p-polarized radiation having a first wavelength corresponding to the predetermined spectrum passing through the polarizing plate into a predetermined viewing space, and passing through at least a second portion of the first p-polarized radiation having a second wavelength, different from the first wavelength;
receiving, by the optical layer, a second p-polarized radiation, among a second radiation being incident on a second side of the optical layer, the second radiation being external to the AR device:
passing, by the optical layer, the second p-polarized radiation to the polarizing plate; and
receiving, by the optical layer, the second p-polarized radiation on the first side of the optical layer after the second p-polarized radiation is reflected by the outputter.

20. The AR display method of claim 19, wherein the outputting comprises outputting the first p-polarized radiation including the visual information such that the first p-polarized radiation including the visual information passes through the polarizing plate and is projected to the optical layer.

21. The AR display method of claim 19, wherein the reflecting comprises reflecting, into the predetermined viewing space, the at least a portion of the first p-polarized radiation with a wavelength corresponding to the predetermined spectrum, among the first p-polarized radiation passing through the polarizing plate.

22. An augmented reality (AR) display apparatus, comprising:
a memory configured to store one or more instructions;
a processor configured to execute the one or more instructions to:
generate visual information; and
control a display panel to output the visual information;

the display panel configured to output first radiation including the visual information in a predetermined spectrum;

a polarizing plate configured to only transmit a first p-polarized radiation, among the first radiation output from the display panel; and an optical layer configured to receive the p-polarized radiation on a first side of the optical layer, reflect at least a first portion of the first p-polarized radiation having a first wavelength corresponding to the predetermined spectrum towards a viewing area, and pass through at least a second portion of the first p-polarized radiation having a second wavelength, different from the first wavelength, wherein the optical layer is further configured to:

receive a second p-polarized radiation, among a second radiation being incident on a second side of the optical layer, the second radiation being external to the AR device pass the second p-polarized radiation to the polarizing plate, and receive the second p-polarized radiation on the first side of the optical layer after the second p-polarized radiation is reflected by the display panel.

23. The AR display apparatus of claim 22, wherein the optical layer is further configured to reflect the at least the portion of the first p-polarized radiation with the first wavelength corresponding to the predetermined spectrum towards the viewing area.

24. The AR display apparatus of claim 22, further comprising:

an optical element configured to adjust a direction of the first p-polarized radiation including the visual information to be incident to the optical layer at a predetermined angle.

25. An augmented reality (AR) display apparatus, comprising:

a windshield of a vehicle; and a multiband dichroic coating layer formed on the windshield of the vehicle, wherein the multiband dichroic coating is configured to:

reflect a first spectrum of radiation incident on the multiband dichroic coating layer from outside the vehicle;

pass through a second spectrum of the radiation incident on the multiband dichroic coating layer from outside the vehicle; and pass through, to the outside, a p-polarized portion of the second spectrum of the radiation, which is polarized and reflected from inside the vehicle.

26. The AR display apparatus of claim 25, wherein the multiband dichroic coating layer is further configured to reflect at least a portion of a p-polarized radiation including visual information generated inside the vehicle towards a viewing area.

27. The AR display apparatus of claim 25, further comprising:

a coating layer, wherein the multiband dichroic coating layer is formed between the windshield and the coating layer.

28. The AR display apparatus of claim 25, wherein the first spectrum includes a first wavelength and the second spectrum includes a second wavelength different from the first wavelength.

* * * * *